US007438831B2

(12) United States Patent
Kaneyoshi

(10) Patent No.: US 7,438,831 B2
(45) Date of Patent: Oct. 21, 2008

(54) ZIRCONIUM OR HAFNIUM AND MANGANESE-CONTAINING OXIDES

(75) Inventor: Masami Kaneyoshi, Takefu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 161 days.

(21) Appl. No.: 11/219,892

(22) Filed: Sep. 7, 2005

(65) Prior Publication Data

US 2006/0027787 A1  Feb. 9, 2006

(30) Foreign Application Priority Data

Sep. 8, 2004  (JP) .............................. 2004-260758

(51) Int. Cl.
  C09K 11/08 (2006.01)
  C09K 11/77 (2006.01)
  H01J 1/62 (2006.01)
  H01J 63/04 (2006.01)

(52) U.S. Cl. .................. 252/301.4 R; 252/301.4 F; 313/503

(58) Field of Classification Search .............. 252/301.4, 252/301.6, 301.36, 301.4 H, 301.4 P, 301.4 R, 252/301.4 F, 301.6 F
See application file for complete search history.

(56) References Cited

U.S. PATENT DOCUMENTS

| 2,171,145 | A | * | 8/1939 | Leverenz .............. 252/301.4 F |
| 2,656,320 | A | * | 10/1953 | Nagy et al. ........... 252/301.6 F |
| 4,767,566 | A | | 8/1988 | Kiss et al. |
| 4,767,567 | A | | 8/1988 | Kiss et al. |
| 2002/0038861 | A1 | * | 4/2002 | Toda et al. ............ 252/301.4 F |

FOREIGN PATENT DOCUMENTS

| EP | 0 158 778 | 10/1985 |
| EP | 1 593 651 | 11/2005 |
| GB | 669380 | 4/1952 |
| JP | 8-73845 | 3/1996 |
| JP | 8-283713 | 10/1996 |
| JP | 11-349939 | 12/1999 |

OTHER PUBLICATIONS

European Search Report dated Jan. 23, 2006 of corresponding European application No. 05 25 5516.

* cited by examiner

*Primary Examiner*—Jerry Lorengo
*Assistant Examiner*—Kevin M Johnson
(74) *Attorney, Agent, or Firm*—Westerman, Hattori, Daniels & Adrian, LLP.

(57) ABSTRACT

Oxo-acid salts, halogenated oxo-acid salts, double oxides or complex oxides contain 0.001-10 atom % of Zr or Hf and 0.001-5 atom % of Mn. They emit radiation in the visible range of 390-750 nm when excited with vacuum-ultraviolet radiation.

7 Claims, 1 Drawing Sheet

US 7,438,831 B2

ZIRCONIUM OR HAFNIUM AND MANGANESE-CONTAINING OXIDES

CROSS-REFERENCE TO RELATED APPLICATION

This non-provisional application claims priority under 35 U.S.C. §119(a) on Patent Application No. 2004-260758 filed in Japan on Sep. 8, 2004, the entire contents of which are hereby incorporated by reference.

TECHNICAL FIELD

This invention relates to Zr or Hf and Mn-containing oxides (oxo-acid salts, halogenated oxo-acid salts, double oxides or complex oxides) possessing characteristic luminescence.

BACKGROUND ART

Zirconium (Zr) and hafnium (Hf) are often contained in phosphors, for example, used in the form of $CaZrO_3$ as host crystals for adding light-emitting elements (see JP-A 8-283713), added to aluminate-based host crystals along with Eu for prolonging the afterglow of emission (see JP-A 8-73845), and added to rare earth oxychlorides or oxybromides along with Ce for improving the conversion efficiency of radiation-excited phosphors (see JP-A 11-349939).

However, few studies have been made on the luminescence and other properties of systems in which only zirconium or hafnium is added as a dopant to clear crystals which do not exhibit active optical characteristics in themselves.

SUMMARY OF THE INVENTION

An object of the invention is to provide Zr or Hf and Mn-containing oxides (oxo-acid salts, halogenated oxo-acid salts, double oxides or complex oxides) which emit radiation in the visible region when excited with vacuum-ultraviolet radiation.

The inventor has found that oxo-acid salts, halogenated oxo-acid salts, double oxides or complex oxides, especially oxo-acid salts such as phosphates, silicates, aluminates or borates of alkaline earth metals or rare earth elements, halogenated oxo-acid salts such as halogenated phosphates, or combinations of these oxo-acid salts (double oxides or complex oxides), containing zirconium (Zr) or hafnium (Hf) in an amount of 0.001 atom % to 10 atom % based on the entire atoms and further containing manganese (Mn) in an amount of 0.001 atom % to 5 atom % based on the entire atoms are useful phosphors because they emit radiation having a peak wavelength in the visible region of 390 to 750 nm, especially 420 to 680 nm, by virtue of energy transfer from Zr or Hf to Mn when excited with vacuum-ultraviolet radiation.

As mentioned above, great efforts have been made on the research and development of phosphors adapted for excitation in the vacuum-UV region, which will find use in plasma display panels and rare gas discharge lamps free of mercury. The inventor discovered that phosphors capable of emitting near-ultraviolet radiation when excited with vacuum-ultraviolet radiation are obtained by adding zirconium or hafnium to host crystals in the form of phosphates, silicates or aluminates of alkaline earth or rare earth elements (U.S. Ser. No. 11/099,586 or EP Application No. 05252197.8). The inventor further discovered that when Mn is added to rare earth phosphate, one of the foregoing host crystals, along with Zr or Hf, the ultraviolet emission due to Zr or Hf is efficiently converted into blue emission through energy transfer, and that blue emission is enhanced by the addition of Zr or Hf as compared with the addition of Mn alone (U.S. Ser. No. 11/099,597 or EP Application No. 05252203.4). To find a wider range of application, the phosphor is desired to produce radiation of various colors covering the visible region.

In one aspect, the present invention provides an oxide in the form of an oxo-acid salt, halogenated oxo-acid salt, double oxide or complex oxide, containing zirconium or hafnium in an amount of 0.001 atom % to 10 atom % based on the entire atoms and manganese in an amount of 0.001 atom % to 5 atom % based on the entire atoms.

In a preferred embodiment, zirconium or hafnium and manganese form a solid solution with a host crystal, said host crystal being an oxide containing oxygen, at least one element selected from alkaline earth metal elements and rare earth elements, at least one element selected from P, Al, Si and B, and optionally an element selected from F and Cl. More preferably, the host crystal is a silicate containing Ca and/or Mg, a complex oxide containing Ca, Al, Si and O, a fluorinated phosphate containing Ca, or a borate containing a rare earth element, with which zirconium or hafnium and manganese form a solid solution.

Typically the oxide is used as a phosphor in that it emits radiation in the visible range of 390 to 750 nm when excited with ultraviolet radiation of 130 to 220 nm.

The oxides in the form of oxo-acid salts, halogenated oxo-acid salts, double oxides or complex oxides, containing zirconium or hafnium and manganese according to the invention efficiently produce luminescence in the visible region of wavelength 390 to 750 nm when excited with radiation in the vacuum-UV region, typically the resonance line emission (147 nm) of xenon atom and will find use as phosphors in mercury-free discharge lamps.

DESCRIPTION OF THE PREFERRED EMBODIMENTS

Figure 1:
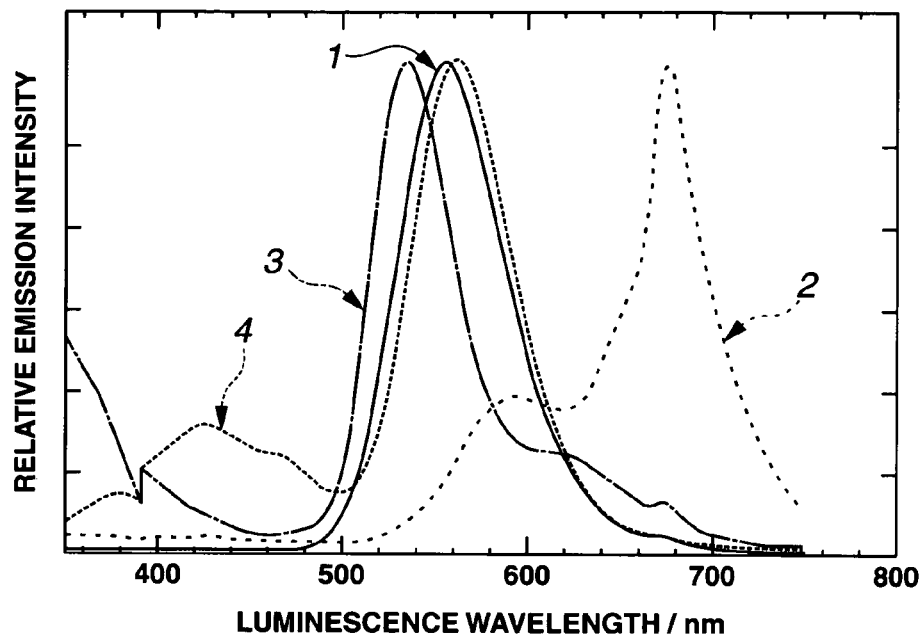
FIG. 1 is a chart illustrating the luminescence spectra from the samples of Examples 1 to 4 when excited with radiation of 147 nm.

The oxide of the invention is an oxo-acid salt, halogenated oxo-acid salt, double oxide or complex oxide, containing zirconium or hafnium in an amount of 0.001 atom % to 10 atom % based on the entire atoms and manganese in an amount of 0.001 atom % to 5 atom % based on the entire atoms.

The host crystals used for the oxide include oxo-acid salts and halogenated oxo-acid salts such as phosphates, silicates, aluminates or borates of alkaline earth metals, i.e., Be, Mg, Ca, Sr and Ba belonging to Group IIA in the Periodic Table or rare earth elements, i.e., Sc and Y and lanthanoids of atomic number 57 to 71 belonging to Group IIIA in the Periodic Table, and combinations of these oxo-acid salts (referred to as double oxides or complex oxides).

The host crystals which can be used in the oxides of the invention include oxo-acid salts, double oxides, and complex oxides which contain oxygen, at least one element selected from alkaline earth metal elements and rare earth elements, and at least one element selected from P, Al, Si and B, and halogenated oxo-acid salts which contain halogen atoms such as F and Cl in addition to the foregoing elements. The preferred host crystals include complex oxides (or silicates) containing Ca and/or Mg, Si and O, complex oxides (or aluminosilicates) containing Ca, Al, Si and O, fluorophosphates containing Ca, and borates containing a rare earth element(s) because certain quantities of zirconium or hafnium and manganese are likely to form a solid solution uniformly with these oxides.

The composition of these host crystals is typified by $CaMgSi_2O_6$ and $Ca_2MgSi_2O_7$ for the Ca and/or Mg-containing silicates; $CaAl_2Si_2O_8$ and $Ca_2Al_2SiO_7$ for the aluminosilicates; $Ca_5(PO_4)_3F$ for the fluorophosphates; and $YBO_3$ and $YAl_3(BO_3)_4$ for the rare earth-containing borates.

According to the invention, Zr or Hf is added to the above-mentioned host crystals in an amount of 0.001 atom % to 10 atom %, preferably 0.01 atom % to 5 atom %, based on the entire atoms. At the same time, Mn is added to the above-mentioned host crystals in an amount of 0.001 atom % to 5 atom %, preferably 0.01 atom % to 2 atom %, based on the entire atoms. With less than 0.001 atom % of Zr or Hf or Mn, no substantial luminescence is observable. If the amount of addition or substitution is increased beyond 10 atom % of Zr or Hf or beyond 5 atom % of Mn, such an excess does not effectively substitute or form a solid solution in the crystal, but inconveniently forms different chemical species. Zirconium is preferred to hafnium because of richer resources and lower costs.

Now the method of preparing oxo-acid salts, halogenated oxo-acid salts, double oxides or complex oxides is described. Although the method is not particularly limited, it generally starts with raw materials including oxides, fluorides, carbonates and oxalates in powder form containing the metal elements of which the oxo-acid salts, halogenated oxo-acid salts, double oxides or complex oxides are comprised, and optionally, silicon oxide, phosphorus-containing materials such as phosphoric acid and ammonium phosphate, and boron-containing materials such as boric acid, boron oxide and ammonium borate. A method commonly used in the art involves the steps of mixing such powdery raw materials and optional materials, and heating the mix at a temperature of 800 to 1,800° C. for a period of 30 minutes to 24 hours to induce reaction, and it will find a wider range of application. This method is advantageously used in the practice of the present invention. With respect to the metal elements and silicon, it is preferred to weigh and mix their raw materials in accordance with the target composition. With respect to the phosphate and borate materials, it is sometimes effective to mix them in amounts which are larger than the target composition by one equivalent to about two equivalents. A flux such as alkali metal fluorides may be added to accelerate the reaction.

Another method is by mixing pre-formed oxo-acid salts or complex oxides in powder form with Zr or Hf or Mn-containing oxides, carbonates or oxalates in powder form, and other components in powder form such as phosphate or borate materials in such amounts as to give the desired composition, and heating the mix in the above-defined temperature range for the above-defined period for inducing reaction. This method can also be used in the practice of the present invention.

An alternate method starts with water-soluble compounds containing some or all of the elements of which the oxo-acid salts, halogenated oxo-acid salts, double oxides or complex oxides of the invention are comprised. The water-soluble compounds are reacted in solution form whereby the reaction product is precipitated and dried or fired to remove water. The product is the desired oxo-acid salt, halogenated oxo-acid salt, double oxide or complex oxide or an intermediate thereto.

When two or more powders are mixed, the mixing technique is not particularly limited. A mortar, fluidized mixer or inclined rotary drum mixer may be used.

The atmosphere in which the materials are heated for reaction may be selected from air, inert gas atmospheres and reducing gas atmospheres, depending on a particular type of host crystal. Usually, an inert gas atmosphere such as nitrogen or argon is preferred because manganese is maintained in the divalent state.

EXAMPLE

Examples of the invention are given below by way of illustration and not by way of limitation.

Synthesis of Starting Materials

Manganese oxalate was prepared by mixing an aqueous manganese chloride solution with an aqueous ammonium oxalate solution and allowing the product to precipitate, followed by filtration and drying.

Calcium hydrogen phosphate ($CaHPO_4$) was prepared by dispersing calcium hydroxide in water, adding a slight excess of phosphoric acid thereto, and stirring the dispersion for reaction to take place, followed by filtration and drying.

Example 1

In an automated mortar, 3.60 g of calcium carbonate (reagent grade, 99.99% $CaCO_3$, by Wako Pure Chemical Industries, Ltd.), 4.08 g of aluminum oxide $Al_2O_3$ (Taimicron TM-DA, by Taimei Chemicals Co., Ltd.), 4.81 g of silicon oxide $SiO_2$ (1-FX, by Tatsumori Co., Ltd.), 0.256 g of manganese oxalate, 0.099 g of zirconium oxide $ZrO_2$ (TZ-0 by Tosoh Corp.), and 0.067 g of sodium fluoride NaF (guaranteed reagent, by Wako Pure Chemical Industries, Ltd.) were mixed. The mix was placed in an alumina crucible and heated to 1,200° C. in an electric furnace through which nitrogen gas flowed at 0.7 $dm^3$/min (calculated in the standard state). The mix was held at the temperature for 4 hours, and then cooled in the nitrogen stream. The fired product was disintegrated on a mortar into a powder.

Example 2

A powder sample was prepared by the procedure of Example 1 aside from using 3.60 g of calcium carbonate, 1.29 g of magnesium oxide MgO (500A, by Ube Materials Co., Ltd.), 4.81 g of silicon oxide $SiO_2$, 0.633 g of manganese oxalate, and 0.493 g of zirconium oxide.

Example 3

In an automated mortar, 2.26 g of yttrium oxide $Y_2O_3$ (4N product, by Shin-Etsu Chemical Co., Ltd.), 3.82 g of aluminum oxide, 6.80 g of boric acid $H_3BO_3$ (guaranteed reagent, by Wako Pure Chemical Industries, Ltd.), 0.395 g of manganese oxalate, and 0.308 g of zirconium oxide were mixed. The mix was placed in an alumina crucible and heated to 1,100° C. in an electric furnace through which nitrogen gas flowed at 0.7 $dm^3$/min (calculated in the standard state). The mix was held at the temperature for 3 hours, and then cooled in the nitrogen stream. The fired product was disintegrated on a mortar into a powder.

Example 4

A powder sample was prepared by the procedure of Example 3 aside from using 8.17 g of calcium hydrogen phosphate $CaHPO_4$, 1.60 g of calcium carbonate, 1.56 g of calcium fluoride $CaF_2$ (guaranteed reagent, by Wako Pure Chemical Industries, Ltd.), 0.160 g of manganese oxalate, 0.123 g of zirconium oxide, and 0.084 g of sodium fluoride.

Comparative Example 1

A powder sample was prepared by the procedure of Example 1 aside from using 3.80 g of calcium carbonate, 4.08 g of aluminum oxide, 4.81 g of silicon oxide, and 0.310 g of manganese oxalate.

Comparative Example 2

In an automated mortar, 4.07 g of calcium carbonate, 5.10 g of aluminum oxide, 6.01 g of silicon oxide, and 0.385 g of zirconium oxide were mixed. The mix was placed in an alumina crucible and heated to 1,200° C. in an electric furnace in the ambient air. The mix was held at the temperature for 3 hours and then cooled. The fired product was disintegrated on a mortar into a powder.

[Measurement of Luminescence Spectrum]

Using a vacuum-UV region absorption/luminescence spectrometer (Bunkoh Keiki Co., Ltd.), the luminescence spectra of the samples of Examples 1 to 4 and Comparative Examples 1, 2 when excited with 147-nm radiation were measured.

Example 1: $(Ca_{0.9}Mn_{0.04}Zr_{0.02}Na_{0.04})Al_2Si_2O_8$
Example 2: $(Ca_{0.9}Mn_{0.1})(Mg_{0.8}\square Zr_{0.1})Si_2O_6$
Example 3: $(Y_{0.8}Mn_{0.1}Zr_{0.1})Al_3(BO_3)_4$
Example 4: $(Ca_{0.96}Mn_{0.01}Zr_{0.01}Na_{0.02})_5(PO_4)_3F$
Comparative Example 1: $(Ca_{0.95}Mn_{0.05})Al_2Si_2O_8$
Comparative Example 2: $(Ca_{0.86}Zr_{0.07})Al_2Si_2O_8$ FIG. 1 is a chart illustrating the luminescence spectra from the samples of Examples 1 to 4 when excited with radiation of 147 nm. The spectra are standardized so that their peak height is identical. Curves 1 to 4 correspond to Examples 1 to 4, respectively. All the samples produce emissions in the visible region.

Figure 2:
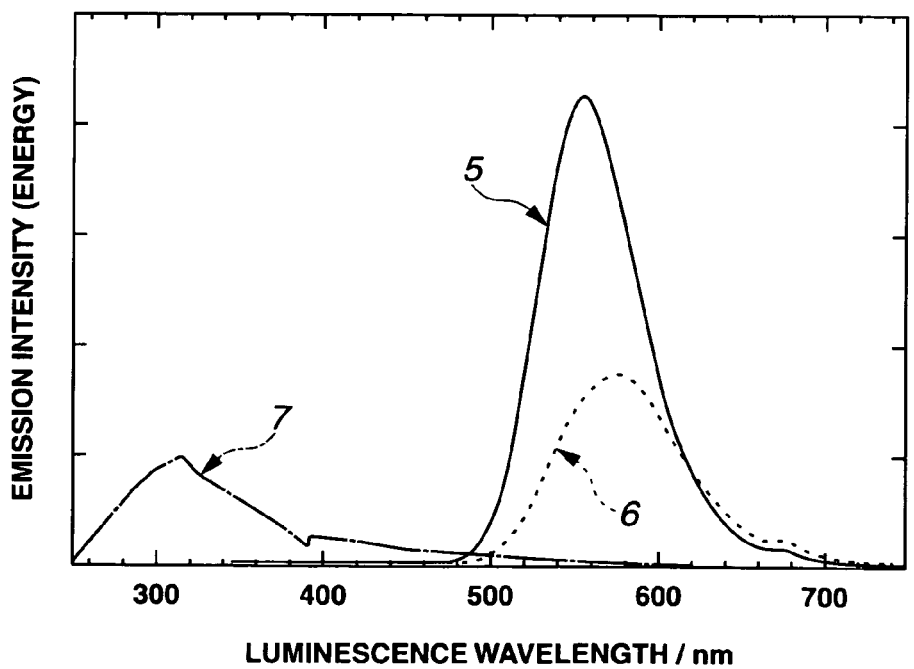
FIG. 2 is a chart illustrating the luminescence spectra from the samples of Example 1 and Comparative Examples 1 and 2 when excited with radiation of 147 nm.

FIG. 2 is a chart illustrating the luminescence spectra from the samples of Example 1 and Comparative Examples 1 and 2 when excited with radiation of 147 nm. Curve 5 corresponds to Example 1 and curves 6 and 7 correspond to Comparative Examples 1 and 2, respectively. The ordinate is corrected so as to be in proportion to the actual luminescence intensity or energy. It is seen that Example 1 produces yellow emission while the UV emission inherent to Comparative Example 2 with only Zr added has disappeared. The yellow emission is enhanced over Comparative Example 1 with only Mn added.

Japanese Patent Application No. 2004-260758 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An oxide which is $(Ca_{0.9}Mn_{0.04}Zr_{0.02}Na_{0.04})Al_2Si_2O_8$, $(Ca_{0.9}Mn_{0.1})(Mg_{0.8}\square_{0.1}Zr_{0.1})Si_2O_6$, $(Y_{0.8}Mn_{0.1}Zr_{0.1})Al_3(BO_3)_4$, or $(Ca_{0.96}Mn_{0.01}Zr_{0.01}Na_{0.02})_5(PO_4)_3F$.

2. The oxide of claim 1, which is $(Ca_{0.9}Mn_{0.04}Zr_{0.02}Na_{0.04})Al_2Si_2O_8$.

3. The oxide of claim 1, which is $(Ca_{0.9}Mn_{0.1})(Mg_{0.8}\square_{0.1}Zr_{0.1})Si_2O_6$.

4. The oxide of claim 1, which is $(Y_{0.8}Mn_{0.1}Zr_{0.1})Al_3(BO_3)_4$.

5. The oxide of claim 1, which is $(Ca_{0.96}Mn_{0.01}Zr_{0.01}Na_{0.02})_5(PO_4)_3F$.

6. The oxide of claim 1, which is used as a phosphor.

7. The oxide of claim 1, which emits radiation in the visible range of 390 to 750 nm when excited with ultraviolet radiation of 130 to 220 nm.

* * * * *